United States Patent
Guo et al.

(10) Patent No.: US 7,515,511 B2
(45) Date of Patent: Apr. 7, 2009

(54) OPTICAL DISK DRIVE SYSTEM WITH QUASI-PARALLEL TASKING AND SERVO CONTROL METHOD

(76) Inventors: Hans Guo, 8Fl., No. 533, Jungjeng Rd., Shindian City, Taipei (TW) 231; Morris Chu, 8Fl., No. 533, Jungjeng Rd., Shindian City, Taipei (TW) 231

(*) Notice: Subject to any disclaimer, the term of this patent is extended or adjusted under 35 U.S.C. 154(b) by 583 days.

(21) Appl. No.: 11/036,125

(22) Filed: Jan. 18, 2005

(65) Prior Publication Data

US 2005/0201214 A1     Sep. 15, 2005

Related U.S. Application Data

(60) Provisional application No. 60/551,045, filed on Mar. 9, 2004.

(30) Foreign Application Priority Data

Oct. 12, 2004   (TW) .............................. 93130903 A (51) Int. Cl.
*G11B 5/09* (2006.01)
(52) U.S. Cl. .................................................. 369/47.23
(58) Field of Classification Search ....................... None
See application file for complete search history.

(56) References Cited

U.S. PATENT DOCUMENTS

| | | | | |
|---|---|---|---|---|
| 4,811,280 A | * | 3/1989 | Berkowitz et al. | 711/113 |
| 5,262,907 A | * | 11/1993 | Duffy et al. | 360/77.05 |
| 5,825,729 A | * | 10/1998 | Ogasawara et al. | 369/44.27 |
| 7,269,106 B2 | * | 9/2007 | Wijnands et al. | 369/47.23 |

* cited by examiner

*Primary Examiner*—Peter Vincent Agustin
(74) *Attorney, Agent, or Firm*—Perkins Coie LLP (57) ABSTRACT

An optical disk drive system with quasi-parallel tasking comprises a decode/interface module, a servo control module and a procedure switch module. The decode/interface module receives and decodes at least one instruction to generate at least one corresponding procedure state. The servo control module generates at least one command according to the procedure state. The procedure switch module switches between the decode/interface module and the servo control module according to a received break signal. Furthermore, a servo control method is disclosed and comprises the following steps of: performing a decode/interface procedure for receiving and decoding at least one instruction to generate at least one corresponding procedure state; performing a servo control procedure for generating at least one command according to the procedure state; performing a break procedure for switching between the decode/interface procedure and the servo control procedure according to a received break signal.

22 Claims, 8 Drawing Sheets

OPTICAL DISK DRIVE SYSTEM WITH QUASI-PARALLEL TASKING AND SERVO CONTROL METHOD

CROSS REFERENCE TO RELATED APPLICATIONS

The applicants claim the benefit of the filing data of provisional application No. 60/551,045 filed Mar. 9, 2004, under 35 U.S.C. § 119(e) (1). This application also claims priority under 35 U.S.C. §119(a) on Patent Application No. 093130903 filed in Taiwan, Republic of China on Oct. 12, 2004, the entire contents of which are hereby incorporated by reference.

BACKGROUND OF THE INVENTION

1. Field of Invention

The invention relates to an optical disk drive system and, in particular, to an optical disk drive system with quasi-parallel tasking and a servo control method.

2. Related Art

Figure 1:
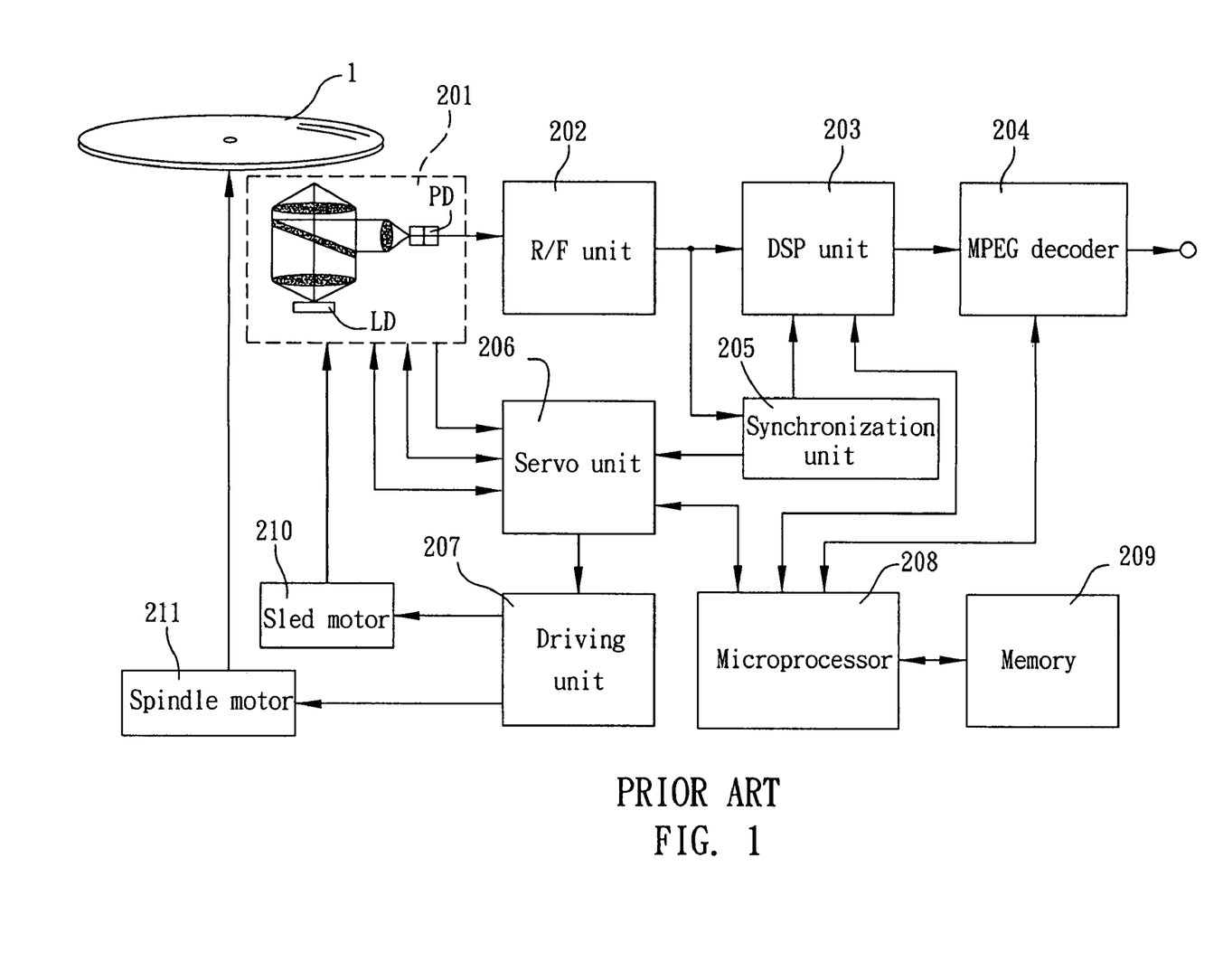
FIG. 1 is a block diagram showing the conventional optical disk drive system.

In a general optical disk drive system, as shown in FIG. 1, it usually comprises an optical pickup head 201 for reproducing signals from an optical disk 1, an R/F unit 202 for equalizing and shaping the RF signals reproduced from the optical disk 1 by the optical pickup head 201, and a synchronization unit 205 for creating a clock signal whose phase is synchronized with the binary data outputted from the R/F unit 202. The disk drive system also comprises a digital signal processing (DSP) unit 203 for processing the binary data stream received from the R/F unit 202 in order to retrieve digital data using the synchronization clock, an MPEG decoder 204 for decoding the retrieved digital data to obtain original pictures or audio data, and a sled motor 210 for moving the optical pickup head 201. The disk drive system further comprises a spindle motor 211 for rotating the optical disk 1, a driving unit 207 for driving the sled motor 210 and spindle motor 211, and a servo unit 206 for controlling the optical pickup head 201 and driving unit 207. A microprocessor 208 supervises overall operations of servo unit 206 and DSP unit 203, and a memory 209 stores data necessary for the microprocessor 208.

In the optical disk drive system, when the optical disk 1 is inserted into a disk tray of the optical disk drive system, it is clamped by a clamping device for alignment. Then, controlled by the servo unit 206, the driving unit 207 provides electric current to rotate the spindle motor 211, and maintains the rotation velocity of the optical disk 1 constant, at about 2,500 rpm.

To reproduce signals recorded on the optical disk 1, the optical pickup head 201, with a laser diode LD and photo diodes PD installed therein, forms a laser beam spot on the recording layer of the optical disk 1 by irradiating a laser beam emitted from the laser diode LD. The laser beam reflected from the optical disk 1 is collected by the photo diodes PD and converted into electric signals. The R/F unit 202 equalizes and shapes the electric signals to produce binary data, and the DSP unit 203 performs the processing of the binary data. The synchronization clock necessary for the DSP unit 203, synchronized with the binary data from the R/F unit 202, is provided by the synchronization unit 205.

The basic role of the sled motor 210 is to move the optical pickup head 201 in the radial direction. Controlled by the servo unit 206, the sled motor 210 moves the optical pickup head 201 rapidly in the radial direction in the track search mode for locating a desired track. If the track search mode is set by a user's request, the microprocessor 208 detects the position of the track which the optical pickup head 201 is currently accessing, calculates the distance between the present track and destination track, and issues a command to move the optical pickup head 201 to the destination track by jumping the calculated distance.

Figure 2:
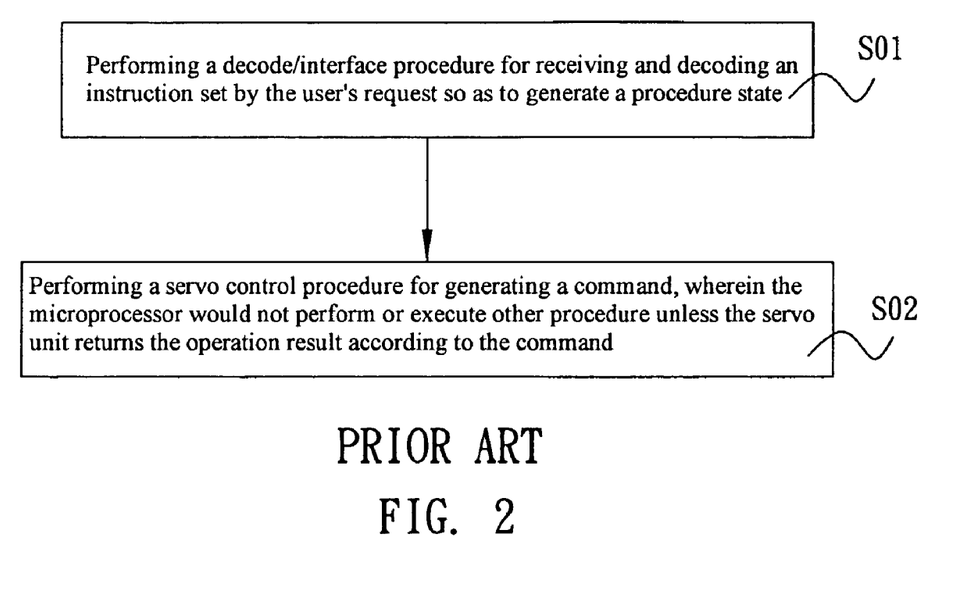
FIG. 2 is a flow chart showing a conventional servo control method.

As shown in FIG. 2, the conventional microprocessor 208 may firstly perform a decode/interface procedure for receiving and decoding the instruction set by the user's request, so as to generate a procedure state, which represents the user's request (Step S01). Then, the microprocessor 208 performs a servo control procedure for generating a command (Step S02). Thus, the servo unit 206 can be controlled according to the issued command. At this point, the microprocessor 208 would not perform or execute other procedure unless the servo unit 206 returns the operation result according to the command. However, the waiting time of the microprocessor 208 results a waste of the microprocessor performance.

It is therefore a subjective of the invention to provide an optical disk drive system, which can solve the above-mentioned problems, for manufacturers and users.

SUMMARY OF THE INVENTION

In view of the foregoing, the invention is to provide an optical disk drive system with quasi-parallel tasking, which can save the waiting time of the microprocessor so as to improve the microprocessor performance.

The invention is also to provide a servo control method for saving the waiting time of the microprocessor so as to improve the microprocessor performance.

To achieve the above, an optical disk drive system with quasi-parallel tasking of the invention comprises a decode/interface module for receiving and decoding an instruction to generate a procedure state, a servo control module for generating a command according to the procedure state, and a procedure switch module for switching between the decode/interface module and the servo control module while receiving a break signal.

The invention also discloses a servo control method, which comprises the following steps of: performing a decode/interface procedure for receiving and decoding at least an instruction to generate at least one corresponding procedure state; performing a servo control procedure for generating at least a command according to the procedure state; and performing a break procedure for switching between the decode/interface procedure and the servo control procedure according to a received break signal.

In addition, the invention provides a recording medium, which records a computer readable control program comprising a decode/interface program code segment, a servo control program code segment, and a procedure switch program code segment. The decode/interface program code segment is for the computer to receive and decode at least an instruction to generate at least one corresponding procedure state. The servo control program code segment is for the computer to generate at least a command according to the procedure state. The procedure switch program code segment is for the computer to switch between performing the decode/interface program code segment and performing the servo control program code segment according to a received break signal.

As mentioned above, the optical disk drive system of the invention can use the procedure switch module to switch between the decode/interface module and the servo control module (switching the on duty module). Thus, the microprocessor is unnecessary to wait the optical disk drive system performing all actions according to the first command, and can receive and decode a next instruction earlier. As a result, the waiting time of the microprocessor can be saved, so that the microprocessor performance is improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3A:
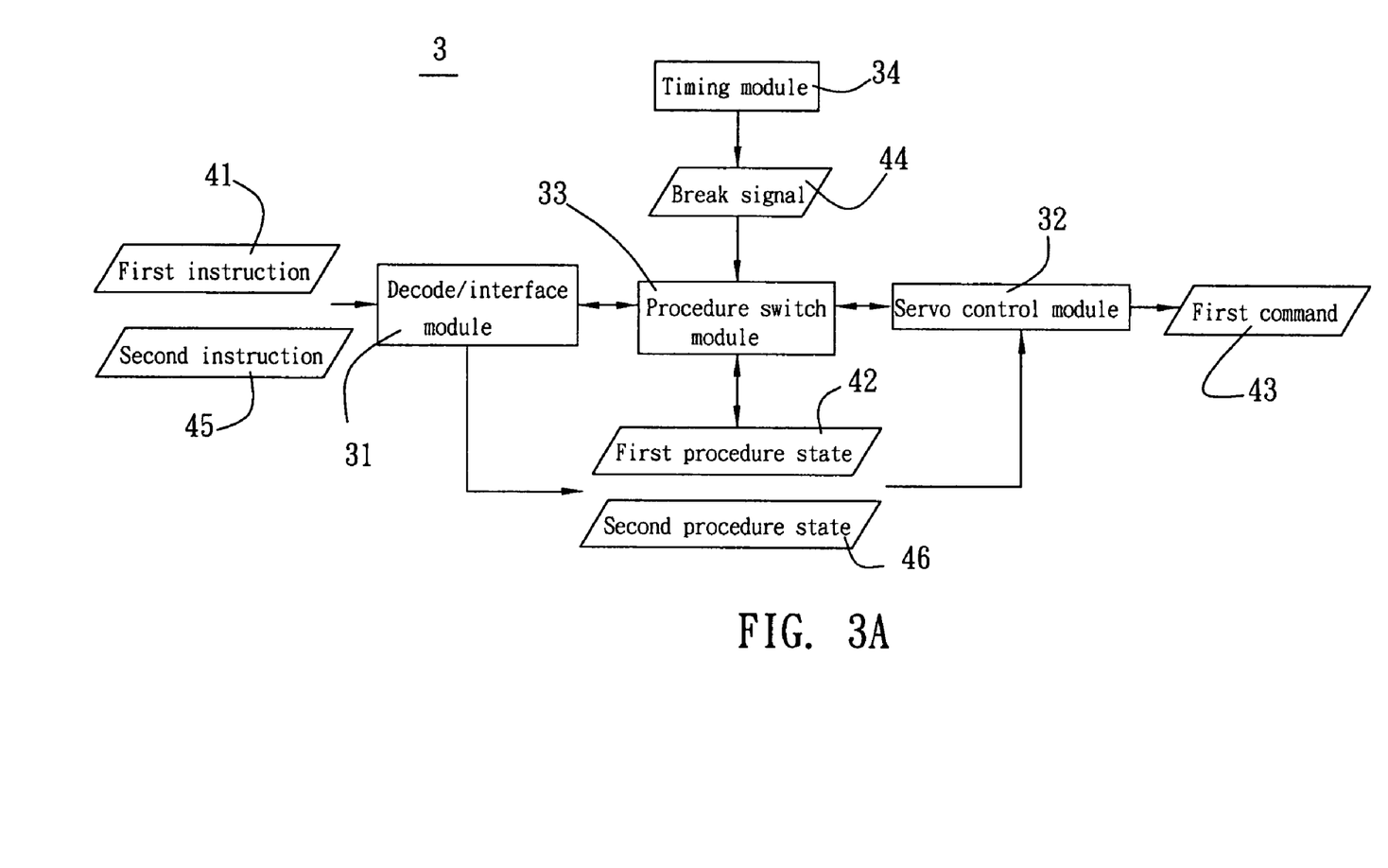
FIGS. 3A to 3C are schematic views showing three possible aspects of an optical disk drive system according to a preferred embodiment of the invention.
Figure 3B:
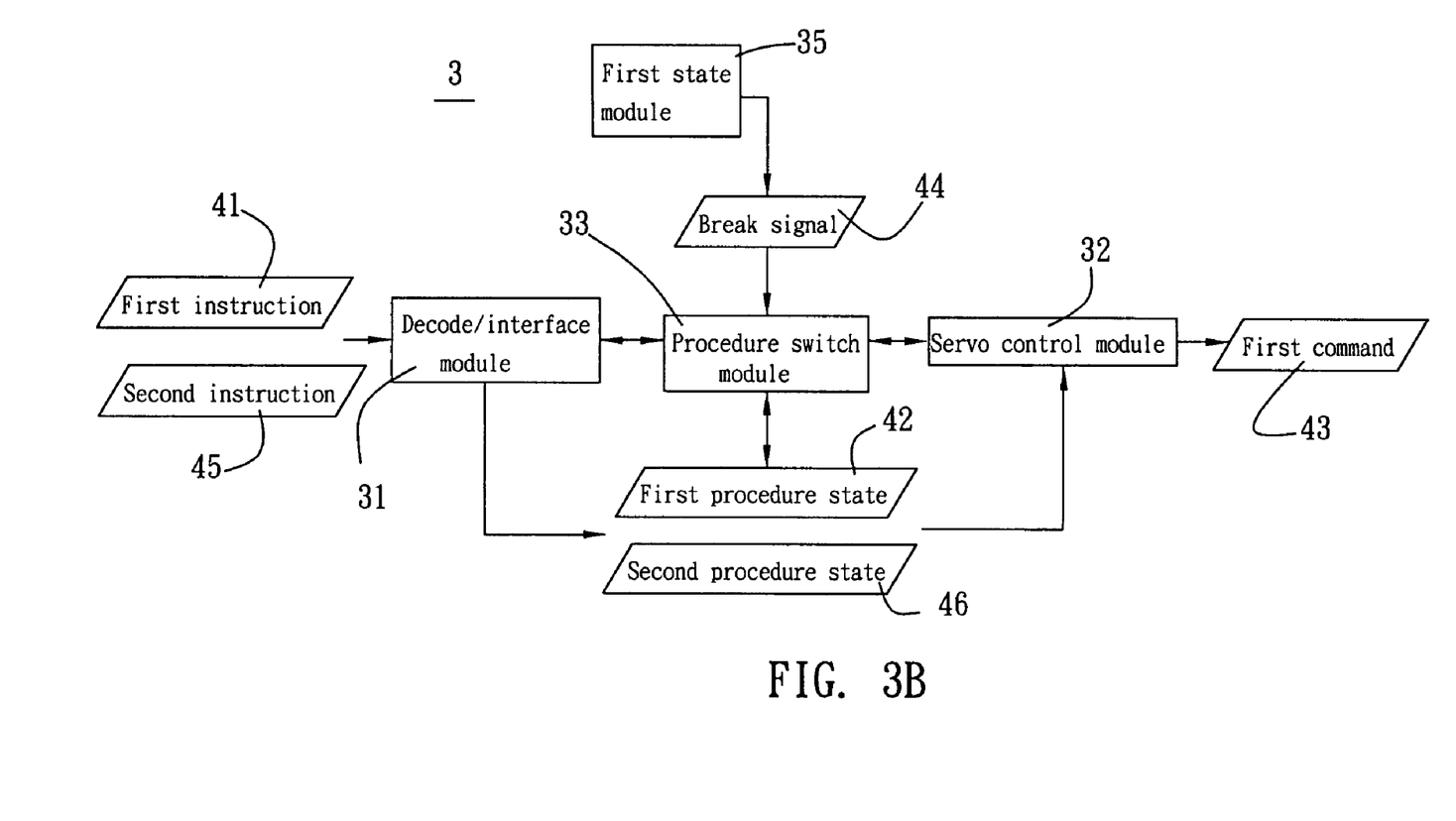
Figure 3C:
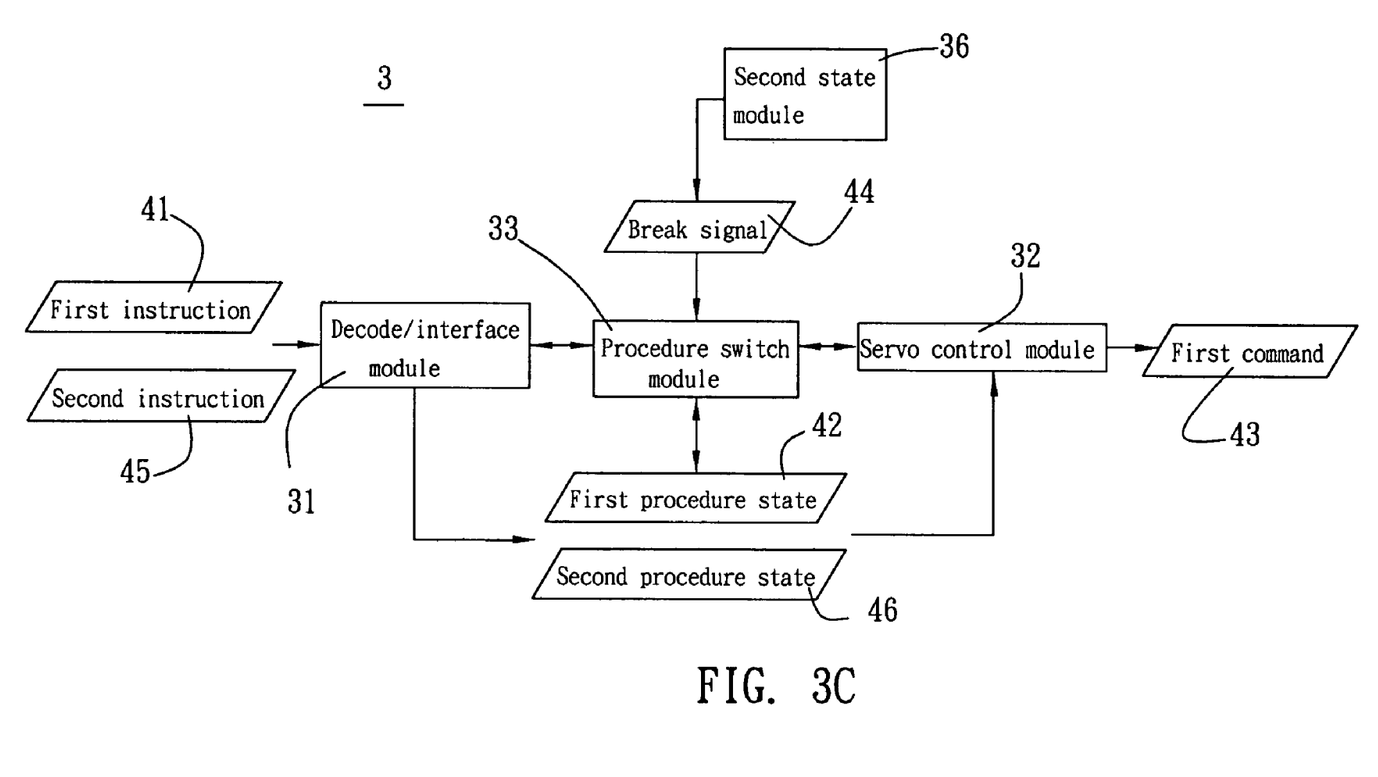

With reference to FIGS. 3A, 3B and 3C, an optical disk drive system 3 with quasi-parallel tasking comprises a decode/interface module 31, a servo control module 32, and a procedure switch module 33. The optical disk drive system 3 may further comprise at least one or more modules selected from a timing module 34, a first state module 35, and a second state module 36.

The decode/interface module 31 receives and decodes the first instruction 41 to generate a first procedure state 42. In the current embodiment, the first instruction 41 is set based on a user's request. For example, before the user places an optical disk into the optical disk drive system, an instruction for rejecting the tray of the optical disk driver system must be performed in advance. In addition, the first instruction 41 may be generated according to the data recorded in an optical recording medium such as the optical disk. The first procedure state 42 presents one state of the optical disk drive system acting according to the first instruction 41, e.g. the state of the previously mentioned rejecting the tray.

The servo control module 32 generates a first command 43 according to the first procedure state 42. In this embodiment, the generated first command 43 will be transmitted to the servo unit, so that the servo unit can act corresponding to the first command 43. For example, the servo unit outputs an electric signal to the driving unit, and then the driving unit is enabled and drives to reject the tray. After that, the user can place the optical disk in the tray.

The procedure switch module 33 switches on duty between the decode/interface module 31 and the servo control module 32 while receiving a break signal 44. Of course, during the period without catching the break signal 44, the procedure switch module 33 can control the decode/interface module 31 and servo control module 32 as prior art. For instance, if the servo control module 32 has completed the current-performed first command 43 before the inputted break signal 44, the decode/interface may consequently work and generate a second instruction 45 as well as the prior art. In this case, it is unnecessary to wait for the break signal 44 before the decode/interface works and generates the second instruction 45.

In the present embodiment, the timing module 34 outputs the break signal 44 to the procedure switch module 33 after every preset period, such as 20 ms. When the procedure switch module 33 receives the break signal 44, the procedure switch module 33 enables the decode/interface module 31 to receive the second instruction 45 and to decode it for generating a second procedure state 46. The second instruction 45 is generated according to the user's request, which is, for example, to inject the tray carrying with the optical disk. In addition, the second instruction 45 may be generated according to an optical recording medium. To be noted, during the period between the servo control module 32 generating the first command 43 and the procedure switch module 33 receiving the break signal 44, the servo control module 32 is at a state for waiting a response signal such as the returned signal from the servo unit 206 shown in FIG. 1. The returned signal comprises the operation result of the optical disk drive system according to the first command 43. For example, the operation result shows that whether the tray rejection is success or not.

In this embodiment, the break signal 44 may be outputted from the first state module 35 when the decode/interface module 31 reaches a first preset state. Alternatively, the break signal 44 may be outputted from the second state module 36 when the servo control module 32 reaches a second preset state. For example, during the period that the first command 43 is performed, the first state module 35 may continuously monitor the amount of external instructions received by the decode/interface module 31. If the unprocessed instructions are accumulated over a predetermined number (e.g. 5), the first state module 35 outputs the break signal 44 to force the action of the procedure switch module 33 for enabling the decode/interface module 31. Thus, the external instructions can be processed no matter the servo control module 32 receives a complete notice presenting that the first command 43 is completed or not. For example, during the period that the second instruction 45 is received, the second state module 36 may continuously monitor any signal that the servo control module 32 receives corresponding to the first command 43. If one signal shows that the first command 43 is completed and a response signal is to be outputted, the second state module 36 outputs the break signal 44 to force the action of the procedure switch module 33 for enabling the servo control module 32 to process this response signal.

Moreover, the embodiment of the invention may be modified as at least one of the following cases. For example, after generating any command, the servo control module 32 may be stopped and does not generate at least one next command until receiving the break signal 44 or a signal from the decode/interface module 31. In addition, after generating the procedure state, the decode/interface module 31 is stopped and does not receive at least one next instruction to generate another procedure state until receiving the break signal 44 or a signal from the servo control module 32. Besides, when the decode/interface module 31 is stopped and the servo control module 32 is working, the procedure switch module 33 receives the break signal 44 and then enables the decode/interface module 31. Alternatively, when the servo control module 32 is stopped and the decode/interface module 31 is working, the procedure switch module 33 receives the break signal 44 and then enables the servo control module 32.

Figure 4:
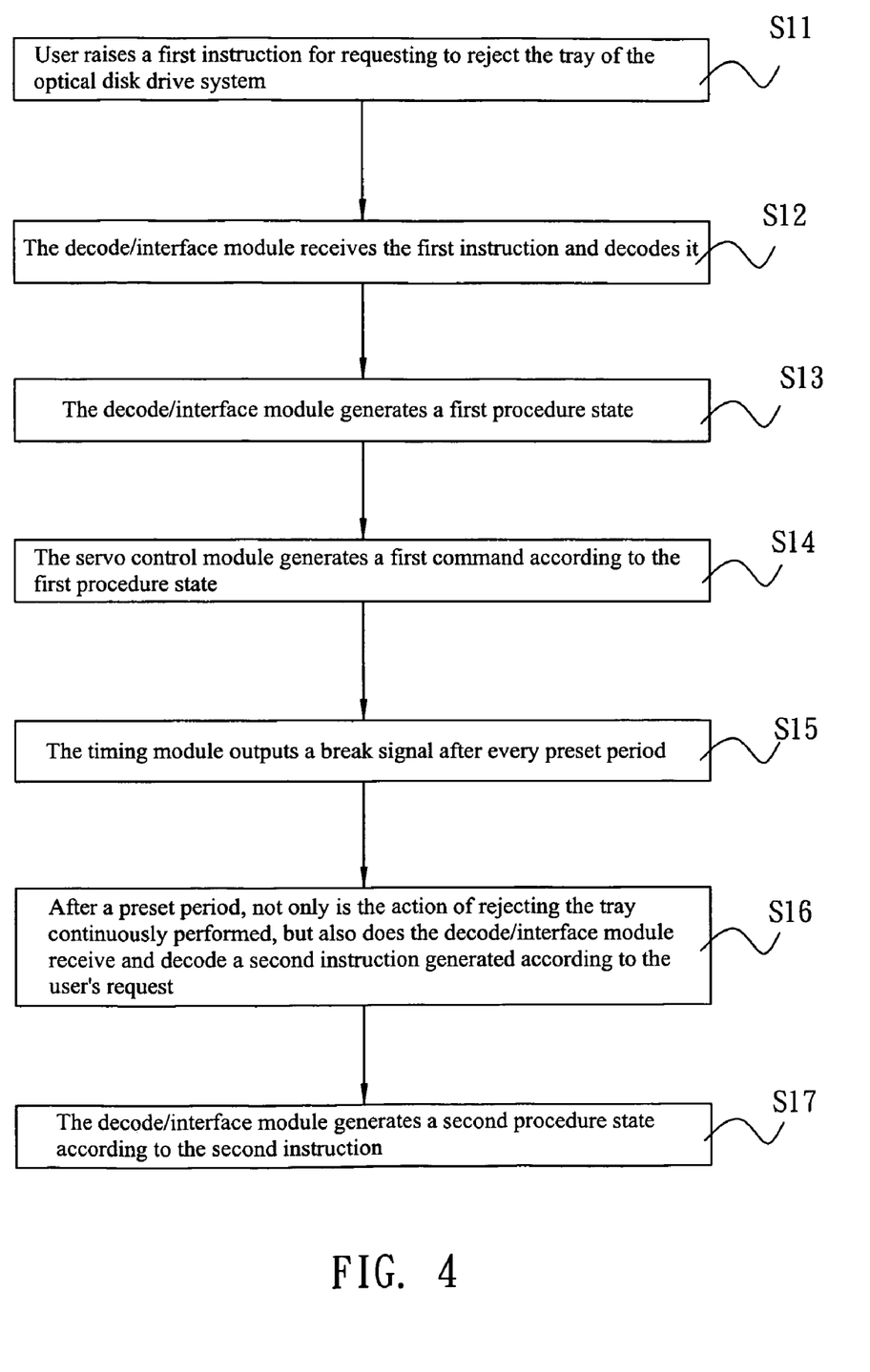
FIG. 4 is a flow chart showing a tray rejection procedure of the optical disk drive system with quasi-parallel tasking according to a preferred embodiment of the invention.

To make the invention more comprehensive, an example of the tray rejection procedure applied in the optical disk drive system 3 with quasi-parallel tasking according to this embodiment will be described hereinafter. With reference to FIG. 4, in step S11, the user raises a first instruction for requesting to reject the tray of the optical disk drive system. In this embodiment, the action of rejecting the tray spends 1.5 second. In step S12, the decode/interface module receives the first instruction and decodes it. In step S13, the decode/interface module generates a first procedure state. After that, the servo control module generates a first command according to the first procedure state in step S14. In step S15, the timing module repeatedly outputs a break signal after every preset period such as 20 ms. According to this break signal, the procedure switch module switches on duty between the decode/interface module and the servo control module. In step S16, after a period of 20 ms, not only is the action of rejecting the tray continuously performed, but also does the decode/interface module receive and decode a second instruction generated according to the user's request. In the present embodiment, the second instruction is to make the tray to be injected. In step S17, the decode/interface module generates a second procedure state according to the second instruction.

Figure 5:
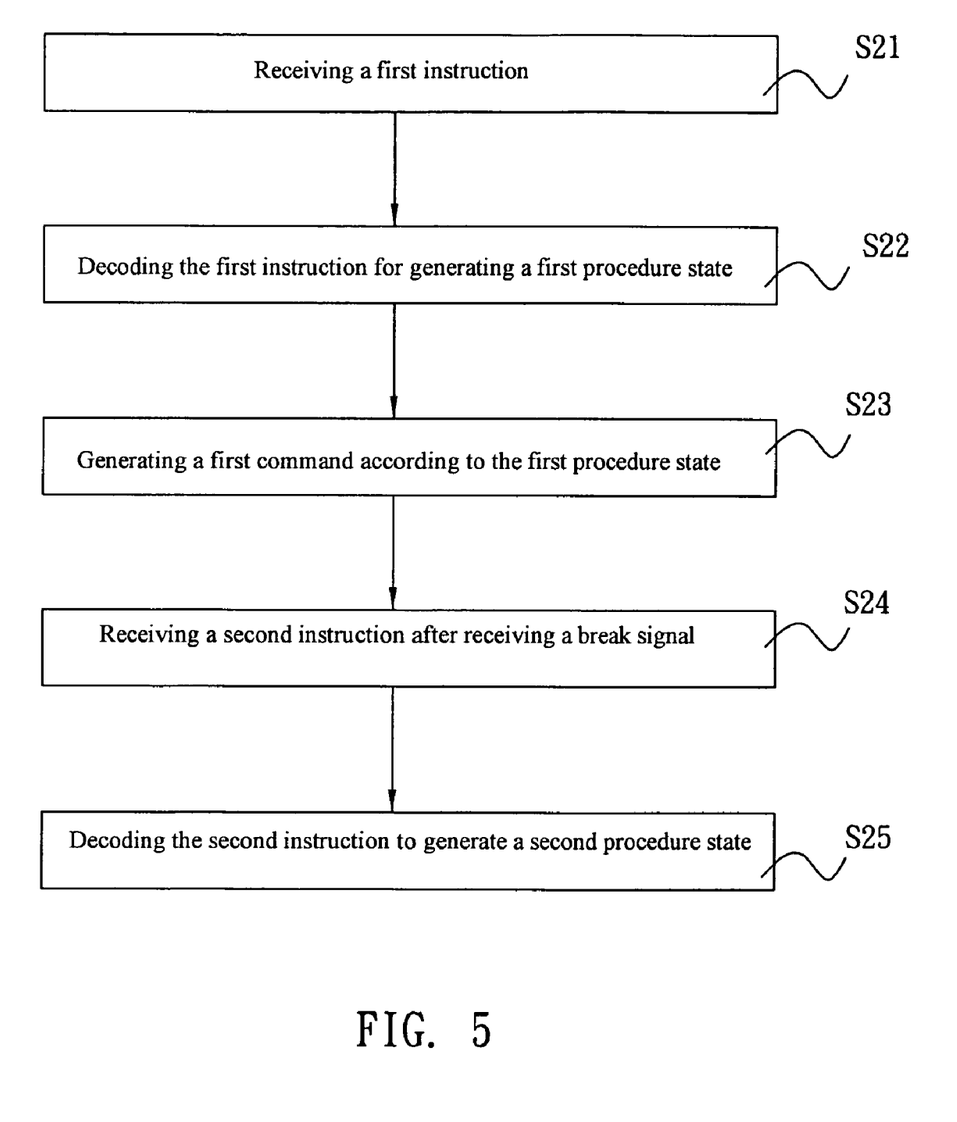
FIG. 5 is a flow chart showing a servo control method according to a preferred embodiment of the invention.

With reference to FIG. 5, the invention also discloses a servo control method comprising the following steps.

Firstly, the step S21 is to receive a first instruction, which is generated according to a user's request. In the current embodiment, the first instruction is raised by the user for requesting to reject the tray of the optical disk drive system. Besides, the first instruction may be generated according to an optical recording medium.

Secondly, the step S22 is to decode the first instruction for generating a first procedure state. In the embodiment, the first procedure state is generated by the decode/interface module 31 according to the first instruction and comprises some codes for executing the first instruction.

Next, the step S23 is to generate a first command according to the first procedure state. In this embodiment, when the first command is transmitted to the servo unit, the servo unit then actions according to the first command. For example, the first command is to allow the servo unit outputting an electric signal to the driving unit. Then, the drive unit can drive the tray for completing the tray rejection action, so that the user can consequently put an optical disk on the tray.

The step S24 is to receive a second instruction after receiving a break signal. In the present embodiment, this second instruction is raised by the user for requesting to inject the tray with the optical disk. Besides, the second instruction may be generated according to the optical recording medium.

Finally, the step S25 is to decode the second instruction to generate a second procedure state. To be noted, during the period between the step S23 for generating the first command and the step S24 for receiving the break signal, the servo control method is in a state of waiting a response signal, which is, for example, responded from the servo unit 206 as shown in FIG. 1. The response signal may comprise the action result of the optical disk drive system after executing the first command. For example, the response signal may indicate that whether the tray rejection action is success or not.

Figure 6:
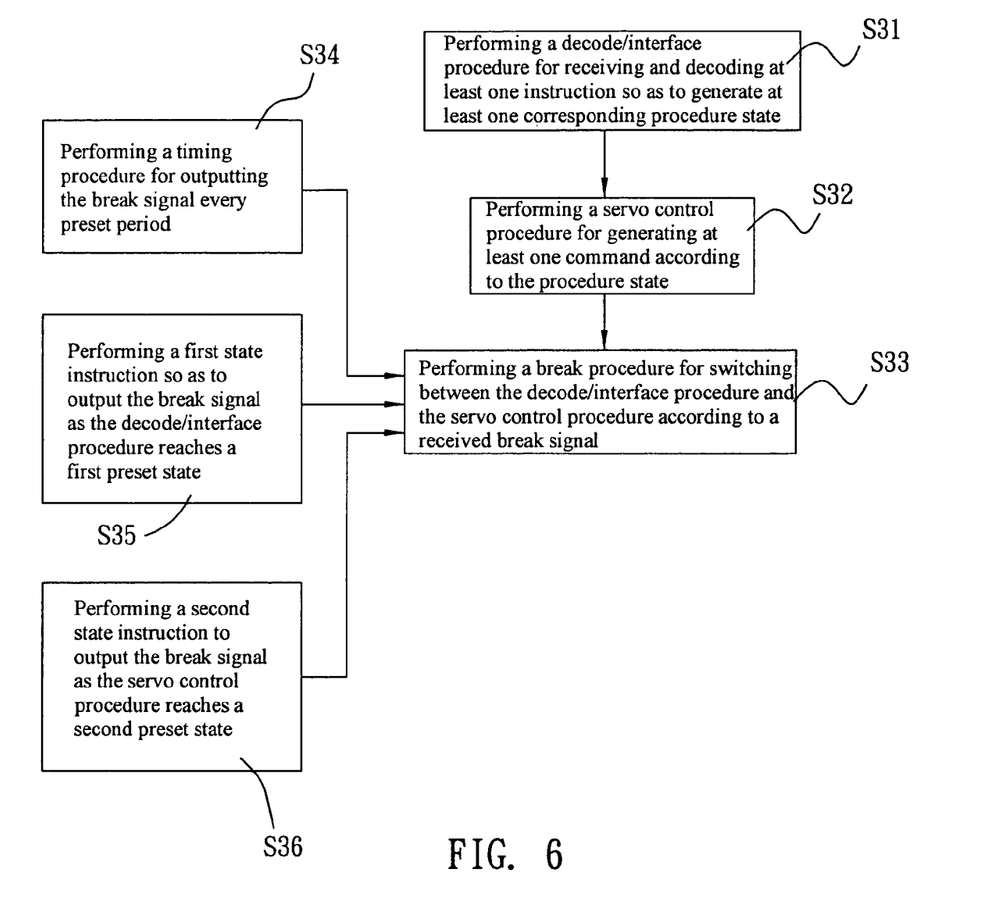
FIG. 6 is a flow chart showing another servo control method according to a preferred embodiment of the invention.

With reference to FIG. 6, the invention also discloses a servo control method comprising the following steps.

Firstly, the step S31 is to perform a decode/interface procedure for receiving and decoding at least one instruction, so as to generate at least one corresponding procedure state.

Next, the step S32 is to perform a servo control procedure for generating at least one command according to the procedure state.

Finally, the step S33 is to perform a break procedure for switching between the decode/interface procedure and the servo control procedure according to a received break signal.

Herein, the break signal may be generated according to at least one of the following steps S34 to S36. The step S34 is to perform a timing procedure, which outputs the break signal every preset period. The step S35 is to perform a first state instruction so as to output the break signal as the decode/interface procedure reaches a first preset state. The step S36 is to perform a second state instruction to output the break signal as the servo control procedure reaches a second preset state.

Furthermore, the embodiment of the invention may be modified as the following cases. For example, after generating any command, the servo control procedure may be stopped and does not generate at least one next command until receiving the break signal or a signal from the decode/interface procedure. In addition, after generating the procedure state, the decode/interface procedure is stopped and does not receive at least one next instruction to generate another procedure state until receiving the break signal or a signal from the servo control procedure. Besides, when the decode/interface procedure is stopped and the servo control procedure is working, the breaking procedure receives the break signal and then enables the decode/interface procedure. Alternatively, when the servo control procedure is stopped and the decode/interface procedure is working, the breaking procedure receives the break signal and then enables the servo control procedure.

The modules of the present embodiment could be software modules stored in the storage device, and any available storage device, such as optical recording medium, DRAM, SRAM or flash memory, can be used to record a program referring to the above-mentioned software modules. The CPU of a computer accesses the software modules, and realizes the functions of the modules for carrying out the above-mentioned servo control method. The program comprises a plurality of program code segments, such as a decode/interface program code segment, a servo control program code segment, and a procedure switch program code segment. The program may further comprise a timing program code segment, a first state program code segment, and/or a second state program code segment. The functions of these program code segments are the same as those of the modules described in the previous embodiment, so the detailed descriptions are omitted for concise purpose.

In summary, the optical disk drive system of the invention can use the procedure switch module to switch between the decode/interface module and the servo control module (switching the on duty module). Thus, the microprocessor does not need to wait for any module of the optical disk drive system to complete all actions, and can make another module perform the next action. For example, the action of rejecting tray according to the first instruction and the action of receiving and decoding the second instruction can be performed within the same period. Accordingly, the invention can carry out the function of quasi-parallel tasking. Therefore, the optical disk drive system and servo control method of the invention can efficiently save the waiting time of the microprocessor, so that the microprocessor performance is improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical disk drive system with quasi-parallel tasking, comprising:
    a decode/interface module that receives and decodes at least an instruction to generate at least one corresponding procedure state;
    a servo control module that generates at least a command according to the at least one procedure state; and
    a procedure switch module that switches between the decode/interface module and the servo control module according to a received break signal, wherein after generating the procedure state, the decode/interface module is stopped and does not receive at least one next instruction to generate another procedure state until receiving the break signal or a signal from the servo control module.

2. The system of claim 1, wherein after generating the command, the servo control module is stopped and does not generate at least one next command until receiving the break signal or a signal from the decode/interface module.

3. The system of claim 1, wherein when the decode/interface module is stopped and the servo control module is working, the procedure switch module enables the decode/interface module once the break signal is received by the procedure switch module.

4. The system of claim 3, wherein when the servo control module is stopped and the decode/interface module is working, the procedure switch module enables the servo control module once the procedure switch module receives the break signal.

5. The system of claim 1, further comprising a timing module that outputs the break signal every preset period.

6. The system of claim 1 further comprising a first state module, which outputs the break signal as the decode/interface module reaches a first preset state.

7. The system of claim 6 further comprising a second state module, which outputs the break signal as the servo control module reaches a second preset state.

8. A servo control method, comprising:
    performing a decode/interface procedure for receiving and decoding at least an instruction to generate at least one corresponding procedure state;
    performing a servo control procedure for generating at least a command according to the at least one procedure state; and
    performing a break procedure for switching between the decode/interface procedure and the servo control procedure according to a received break signal, wherein after generating the procedure state, the decode/interface procedure is stopped and does not receive at least one next instruction to generate another procedure state until receiving the break signal or a signal from the servo control procedure.

9. The method of claim 8 further comprising, after generating the command, the servo control procedure and not generating at least one next command until receiving the break signal or a signal from the decode/interface procedure.

10. The method of claim 8 further comprising, when the decode/interface procedure is stopped and the servo control procedure is performed, enabling the decode/interface procedure once the break signal is received.

11. The method of claim 8 further comprising, when the servo control procedure is stopped and the decode/interface procedure is performed, enabling the servo control module once receives the break signal.

12. The method of claim 8 further comprising at least one of the following:
    performing a timing procedure, which outputs the break signal every preset period;
    performing a first state instruction to output the break signal as the decode/interface procedure reaches a first preset state; and
    performing a second state instruction to output the break signal as the servo control procedure reaches a second preset state.

13. A computer-readable storage medium storing computer-readable instructions that, when executed, causes a computer to perform a control program, the control program comprising:
    a decode/interface program code segment that receives and decode at least an instruction to generate at least one corresponding procedure state;
    a servo control program code segment that generates at least a command according to the procedure state; and
    a procedure switch program code segment that switches between performing the decode/interface program code segment and performing the servo control program code segment according to a received break signal, wherein the servo control program code segment is for the computer to do the following: after generating one procedure state, the computer stops performing the decode/interface program code segment and does not perform the decode/interface program code segment to generate at least one next procedure state until receiving the break signal or a signal produced by the decode/interface program code segment.

14. The recording medium of claim 13, wherein the decode/interface program code segment is for the computer to do the following: after generating one command, the computer stops performing the servo control program code segment and does not perform the servo control program code segment to generate at least one next command until receiving the break signal or a signal produced by the servo control program code segment.

15. The computer-readable storage medium of claim 13, wherein the servo control program code segment and the decode/interface program code segment is for the computer to do the following: when the computer stops performing the decode/interface program code segment and performs the servo control program code segment, the computer starts to perform decode/interface program code segment after receiving the break signal.

16. The computer-readable storage medium of claim 13, wherein the decode/interface program code segment is for the computer to do the following: when the computer stops performing the servo control program code segment and performs the decode/interface program code segment, the computer starts to perform servo control program code segment after receiving the break signal.

17. The computer-readable storage medium of claim 13, further comprising at least one of the following:
    a timing program code segment that causes the computer to output the break signal every preset period;
    a first state program code segment that causes the computer to output the break signal when the computer performs the decode/interface program code segment to reach a first preset state; and
    a second state program code segment that causes the computer to output the break signal as the computer performs the servo control program code segment to reach a second preset state.

18. A method performed by an optical disk drive system to enable parallel tasking, comprising:
- invoking a decode/interface procedure for receiving and decoding an instruction to generate a corresponding procedure state;
- invoking a servo control procedure for generating a command according to the procedure state; and
- invoking a break procedure for switching between the decode/interface procedure and the servo control procedure according to a received break signal that is generated based on a configurable time duration even when a previously invoked instruction or command is incomplete.

19. The method of claim 18 wherein the break procedure receives the generated break signal after a predetermined number of unprocessed instructions accumulate.

20. The method of claim 18 wherein the break procedure is invoked even when the command is not complete.

21. A computer-readable storage medium storing computer-readable instructions that, when executed, causes a computer to perform a control program, the control program comprising:
- causing a decode/interface program code segment to receive and decode an instruction to generate a corresponding procedure state;
- causing a servo control program code segment to generate a command according to the procedure state; and
- causing a procedure switch program code segment to switch between performing the decode/interface program code segment and performing the servo control program code segment according to a received break signal wherein the switch occurs even when the instruction or command is not completed.

22. The computer-readable storage medium of claim 21 further comprising a break signal that is generated according to a specified time frequency.

* * * * *

UNITED STATES PATENT AND TRADEMARK OFFICE
CERTIFICATE OF CORRECTION

PATENT NO.        : 7,515,511 B2                               Page 1 of 1
APPLICATION NO.   : 11/036125
DATED             : April 7, 2009
INVENTOR(S)       : Hans Guo et al.

It is certified that error appears in the above-identified patent and that said Letters Patent is hereby corrected as shown below:

In column 7, line 32, in Claim 5, delete "claim 1," and insert -- claim 1 --, therefore.

In column 7, line 35, in Claim 6, delete "module, which" and insert -- module that --, therefore.

In column 7, line 38, in Claim 7, delete "module, which" and insert -- module that --, therefore.

In column 7, line 56, in Claim 9, after "command," insert -- stopping --.

In column 7, line 67, in Claim 11, delete "once receives the break signal." and insert -- once the break signal is received. --, therefore.

In column 8, line 3, in Claim 12, delete "procedure, which" and insert -- procedure that --, therefore.

Signed and Sealed this

Second Day of June, 2009

JOHN DOLL
*Acting Director of the United States Patent and Trademark Office*